W. MURCHEY.
SCREW CUTTING TAP.
APPLICATION FILED NOV. 9, 1912.

1,100,984.

Patented June 23, 1914.

2 SHEETS—SHEET 1.

WITNESSES:
R. E. Slaven.
R. B. Lewis.

INVENTOR
William Murchey,
BY
Chas. F. Schmelz
ATTORNEY

UNITED STATES PATENT OFFICE.

WILLIAM MURCHEY, OF DETROIT, MICHIGAN.

SCREW-CUTTING TAP.

1,100,984. Specification of Letters Patent. Patented June 23, 1914.

Application filed November 9, 1912. Serial No. 730,323.

*To all whom it may concern:*

Be it known that I, WILLIAM MURCHEY, a citizen of the United States, residing at Detroit, in the county of Wayne and State of Michigan, have invented certain new and useful Improvements in Screw - Cutting Taps, of which the following is a specification.

This invention relates to devices or tools for cutting screw-threads, and more especially to that class in which the chasers may be withdrawn from the work as soon as they have performed their functions.

Especially, this invention relates to screw-cutting taps, and it has for one of its objects the provision of a device of this character which may be used in connection with the main spindle of a power-driven machine-tool, and in which the chasers may be automatically withdrawn by the advance movement of the work relatively to the tap during the screw cutting operation.

The invention has, furthermore, for its object the provision of improved means for supporting the chasers in the tap body, and of means whereby the chasers may be precisionized, so as to cut threads having a loose or tight fit with the element to be used in conjunction with the work.

The invention has, furthermore, for its object the provision of a tap which comprises, in addition to the chasers above mentioned, one or more turning tools or reamers whereby the surface to be threaded will first be turned into true form and size.

Further objects of the invention will hereinafter appear and be particularly defined in the claims.

The invention has been clearly illustrated in the accompanying drawings in which similar characters denote similar parts, and in which—

Figure 2:
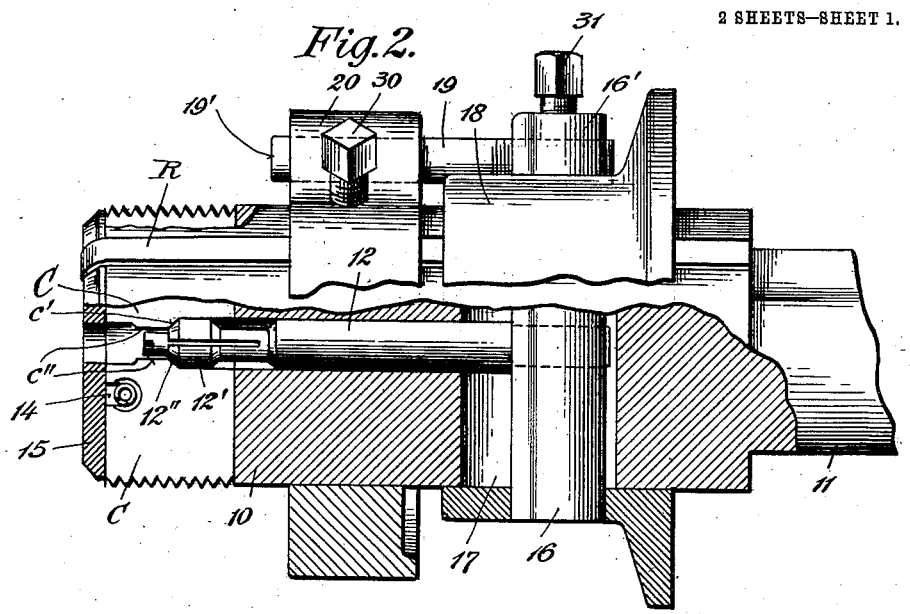
Figure 1:
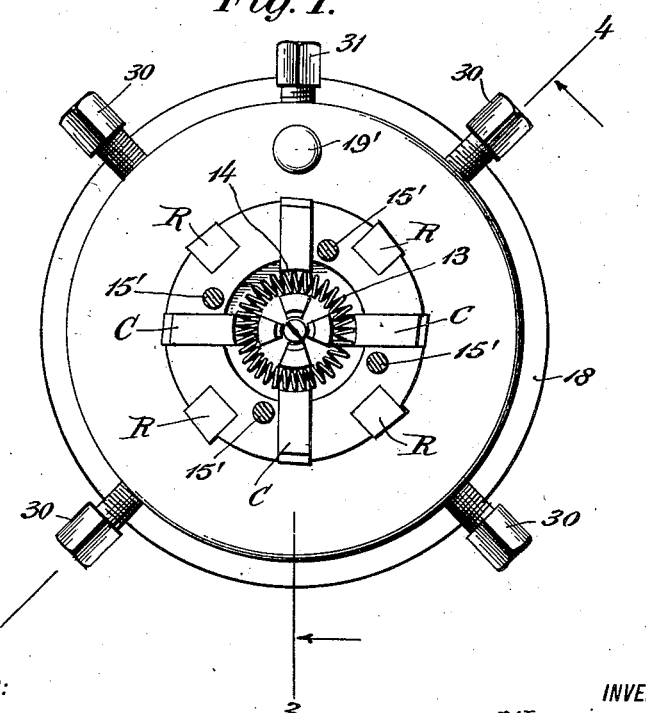
Figure 3:
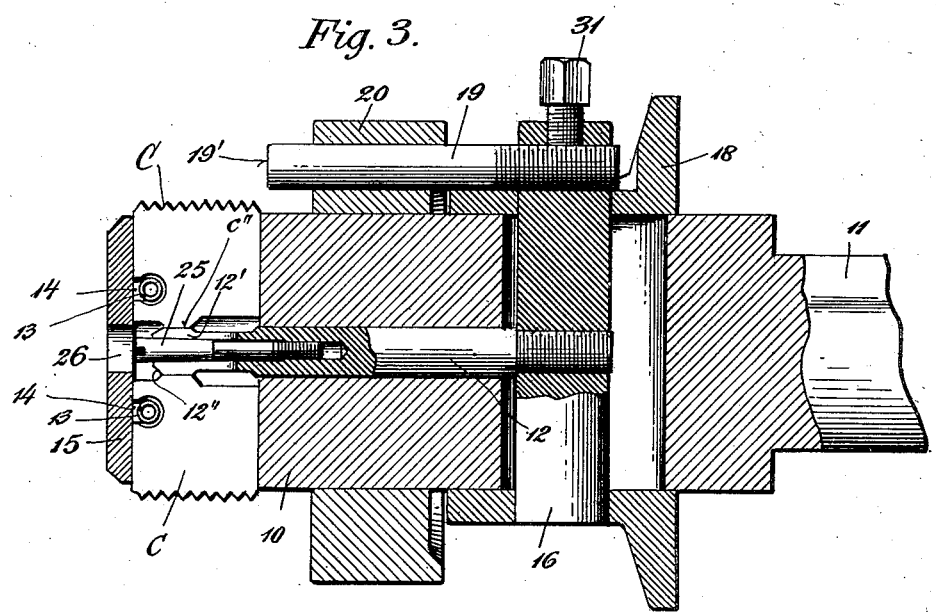
Figure 4:
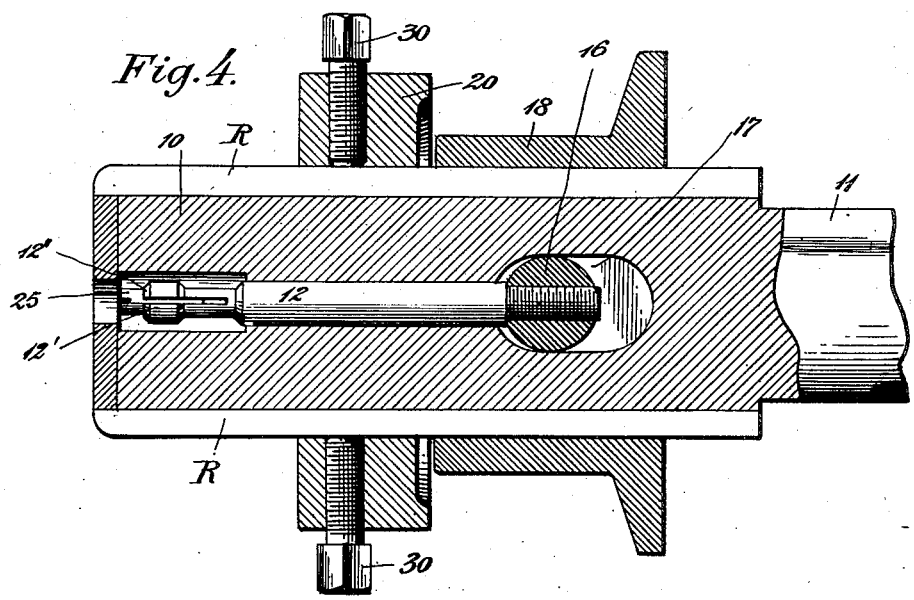

Figure 1 is a face view of a tap embodying my improvement, Fig. 2 is a side view thereof partially broken away, and illustrating the chasers in the retracted or closed-in position. Fig. 3 is a longitudinal section indicated by line 3 of Fig. 1. Fig. 4 is a central longitudinal section on line, 4 of Fig. 1.

Referring to the drawings, 10 denotes the main body of the tap provided at its rear end with a tapered shank 11 adapted to be fitted into the main spindle of a machine-tool. The front end of the body has a series of preferably radial grooves adapted to receive a series of chasers C so as to have a sliding movement radially therein, as controlled or limited inwardly by a central member shown herein as a pin 12 provided with a head 12' which is engaged by the inner faces of the several chasers respectively. The front face 12" of the head 12' is beveled as clearly shown in Fig. 2 to act as a cam face coöperative with a correspondingly shaped face c' of the chasers, so that, when the pin 12 moves forwardly relatively to the tap body, these beveled faces will serve to force all of the chasers radially outwardly, whereupon the flat faces c" will rest upon the outer periphery of the head 12'. This position of the chasers is clearly shown in Fig. 3.

Means are provided for normally retracting all of the chasers simultaneously, or for holding them in contact with the head 12', and I have shown in the present instance a coiled spring 13 seated within recesses 14 provided in the front faces of the chasers respectively. The pin 12 constitutes a medium whereby the chasers will be permitted to release the work, or to stop their cutting operation, at a predetermined point of the latter, as controlled by a member connected with the pin 12 and adjusted relatively thereto for that purpose. Inasmuch as the chasers are mounted for radial movement only, a cap 15 may be secured to the front face as for instance by screws 15' to inclose the chasers. The rear end of the pin 12 is rigidly secured to a cross bar 16 which extends diametrically through an elongated aperture or slot 17 in the tap body 10, the bar 16 projecting through an annular member or thrust ring 18 which serves as an abutment device adapted to contact with a suitable limiting member (not shown, provided on the machine tool for the pin 12 toward the front face of the tap body when it is desired to recommence the tapping operation on a new piece of work. This ring member 18 is moved rearwardly by the work, as the latter advances on the tap during the screw-cutting operation, the bar 16 extending beyond the ring member 18 as shown at 16' to receive an adjustable abutment pin 19 extending toward the front of the tap, and the front face 19' of which is adapted to be engaged by the advancing work, thus moving the ring 18 rearwardly, with the pin 12, and moving the head 12' from under the chaser faces c" (see Fig. 2). The pin 19 is preferably guided in a collar 20 secured to the body of the tap for a purpose to be hereinafter specified.

Means are provided whereby the outward position of the several chasers may be precisionized so as to cut a thread of a certain predetermined size and depth, these means consisting in the present instance of a taper pin 25 used in conjunction with the head 12' of the pin 12, the forward end of the pin being split into a series of what may be termed "jaws" or sections which may be forced apart to increase the size of the head in proportion to the inward travel of the taper pin 25 into the pin 12 with which it is in screw-threaded engagement, as shown in Fig. 3. Access may be had to the pin 25, through an aperture 26 in the plate 15.

As above stated my improved tap comprises one or more reaming tools whereby the work to be tapped may be finished or bored to the required size preparatory to the commencement of the screw-cutting operation by the chasers. For this purpose the tap body is longitudinally grooved to receive in each groove a reaming tool R, all of which tools traverse the collar 20 above mentioned and are held in tight contact with the tap body by set screws 30 in engagement with said collar and binding the reamers in place, as will be readily understood. A binder or set screw 31 may be used in conjunction with the bar 16, to prevent the rotation or loosening of the pin 19 therein.

From the foregoing it will be understood that the time when the chasers are released from the work, depends entirely upon the position of the end face 19' relatively to the chasers, when the pin 12 is in its active position shown in Fig. 3. It will also be understood that by virtue of the beveled faces c' and 12'', such release will take place quickly and practically in one convolution of the screw thread, whereupon the work may be slid clear of the chasers, and a new piece of work may be substituted therefor, or the tap body itself may be moved by the main spindle of the machine until the ring 18 has come to a stop. Continued movement of the tap body will then again force the head 12' between the several chasers and thus bring them into exact cutting position as before.

Many changes may be made in the general organization as particular construction of some of the component elements of my improved device, without departing from the spirit of the invention particularly in the manner of applying the tapered pin, and in the means whereby the several chasers are retracted into non-cutting positions.

I claim:—

1. A tap comprising a body, a series of chasers mounted for radial movement thereon, a device for holding said chasers in their outward positions, and means for expanding said device for variably controlling the outward positions of the chasers.

2. A tap comprising a body, a series of chasers mounted for radial movement thereon, a device for controlling the outward movement of the chasers, and a taper pin for expanding said device for variably controlling the outward positions of the chasers.

3. A tap comprising a body, a series of chasers mounted for radial movement thereon, a pin disposed within said body and having a split head, the several sections engaging the several chasers respectively, and a tapered member for expanding the sections of the pin simultaneously.

4. A tap comprising a body, a series of chasers mounted for radial movement thereon, a pin disposed within the body and having a split head, the several sections engaging the several chasers respectively, and a tapered pin in screwthreaded engagement with the body-pin and bearing against the head-sections for expanding the same to vary the positions of the chasers, simultaneously.

In testimony whereof I affix my signature in presence of two witnesses.

WILLIAM MURCHEY.

Witnesses:
 H. D. MacDonald,
 C. F. Schmelz.